Jan. 30, 1968  M. A. JACKSON  3,366,353
ENERGY ABSORBING DEVICE
Filed March 22, 1966  2 Sheets-Sheet 2

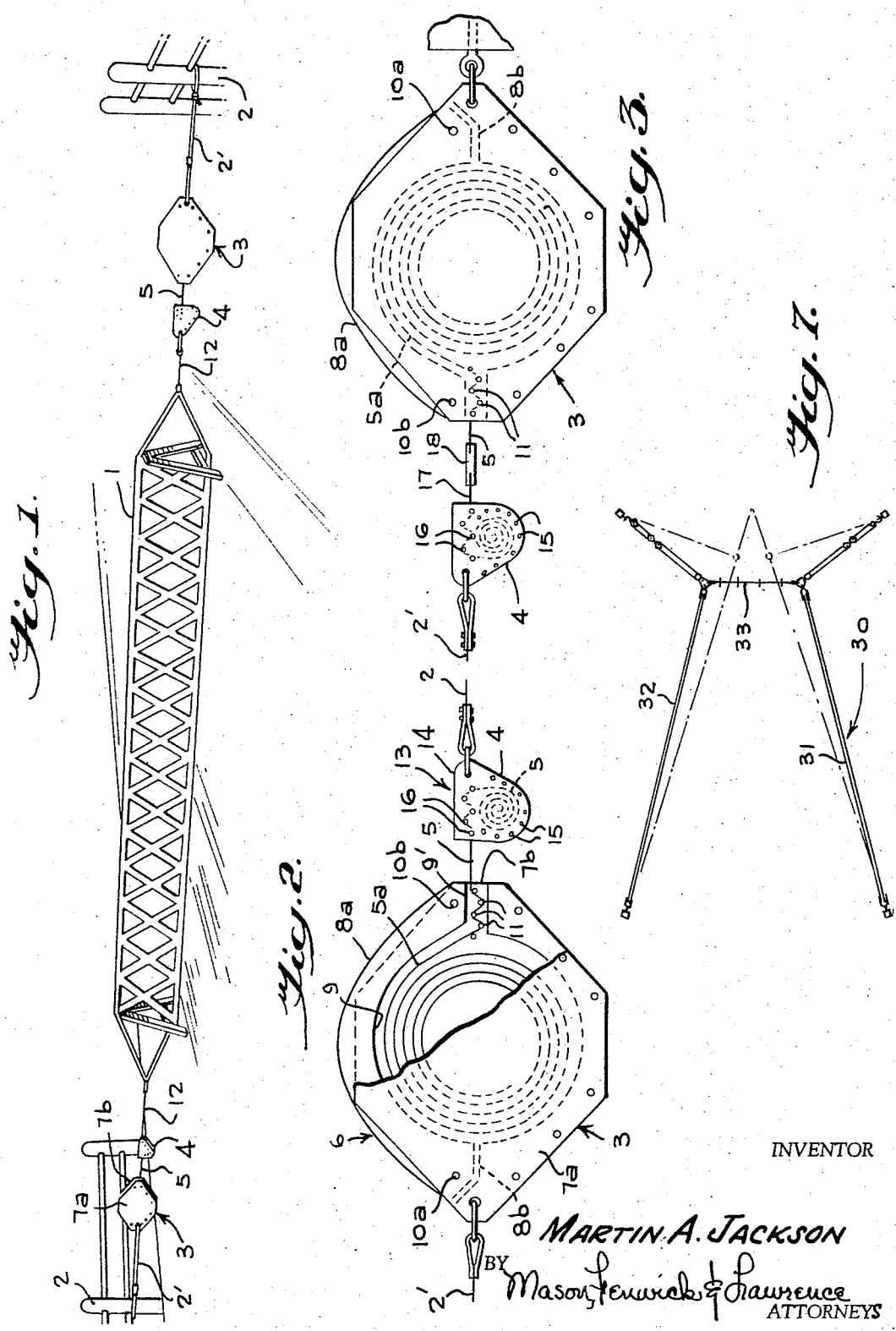

INVENTOR
MARTIN A. JACKSON
BY Mason, Fenwick & Lawrence
ATTORNEYS

2

United States Patent Office 3,366,353
Patented Jan. 30, 1968

3,366,353
ENERGY ABSORBING DEVICE
Martin A. Jackson, Bradshaw, Md., assignor to Van Zelm Associates Inc., Baltimore, Md., a corporation of Maryland
Filed Mar. 22, 1966, Ser. No. 536,457
10 Claims. (Cl. 244—137)

This invention relates to energy absorbing devices and more particularly to those devices capable of withstanding high initial impact loads.

In attempts to improve on methods of achieving the arrestment of high speed bodies, there has been developed a new concept in energy absorption. These devices incorporate a strap, rod or filament of metal, coiled and placed within a container having means for causing the metal element to be deformed beyond its elastic limit when it is pulled from the container.

These devices have application in the military in the arrestment of aircraft and in the extraction of cargo from low flying aircraft. Such a device is described in detail in U.S. Patent No. 3,017,163. It has been found by experiment, however, that in the use of such energy absorbing devices, the initial acceleration load can be so great as to exceed the strength of the metal element and to cause it to break, when large initial loads or high speed loads are arrested by the system.

It is therefore an object of this invention to provide a positive means of dissipating the initial inertia load imposed on an energy absorber.

It is another object of this invention to provide an initial inertia load dissipating unit coupled to the energy absorber to alleviate and absorb the high initial inertia loads imposed upon such a system.

It is a further object of this invention to provide an initial inertia load dissipating and energy absorbing system having the foregoing characteristics which will be efficient in use, durable, and which can be economically manufactured.

In order to clarify terminology and to maintain consistency, reference made to the energy absorbing system means the combination of the two units. It must be understood that each unit, one large and one considerably smaller, is an energy absorber, although they serve different purposes. The large unit absorbs most of the momentum of an object being stopped and shall be referred to as the energy absorber. The smaller unit is a peak load dissipator and acts to prevent breakage of the element due to the high initial acceleration load. Although it too, is an energy absorber, it shall be referred to as a load limiter. In this description and the ensuing claims the terms metal element or metal strip means have been employed to mean strap, tape, rod or any filament of steel or other metal, either as a single uninterrupted and integral length of metal or as a plurality of sections of like or different metallic members secured together in end-to-end relation, which can be bent to a degree exceeding its elastic limit, thereby absorbing energy by the bending of the metal. The terms metal element and tape will be used interchangeably throughout the description within the foregoing definition.

The energy absorbing system has been illustrated in two of its many applications. In many applications, extremely high inertia forces build up in the energy absorber which must be alleviated or the metal element will break. The load limiter absorbs the initial inertia load and consequently prevents the breaking of the element.

As one specific example of use of the energy absorbing system of the present invention, the system may be incorporated in a vehicle arresting system of extensive application in highway safety where it is desired to stop a vehicle, or have the vehicle engage a barrier, such as a standard nylon net or chain link fence, which will yield under the momentum of the vehicle until the momentum of the vehicle is absorbed by the system and ultimately brought to rest. Such a vehicle arresting system can also be used as guard rails or as a dependable barricade at construction sites, road-end detours, and drawbridge approaches. Another obvious use is in police work where it is desired to arrest a speeding vehicle with minimum damage to the vehicle and its occupants.

Another important application, which is also illustrated in the accompanying drawings, is in a cargo extracting system for extracting cargo from a moving aircraft at near zero altitude wherein a ground pickup cable or crossfield pendant is to be engaged by an extraction hook trailing from the aircraft. By providing the energy absorbing system between the extraction hook lanyard and the cargo load, reliable initial inertia load dissipation and energy absorption can be achieved, while minimizing the possibility of metal element breakage under the high initial peak loads imposed thereon.

Other objects and applications of this invention will become apparent from the following description, by way of example only, of the accompanying drawings in which like numerals refer to like parts.

FIGURE 1 illustrates an example of a barrier installation employing the invention;

FIGURE 2 illustrates an energy absorber and load limiter in accordance with this invention;

FIGURE 3 illustrates another arrangement of an energy absorber and load limiter in accordance with this invention;

FIGURE 7 is a top plan view of a typical ground installation for the cargo extraction system.

Figure 4:
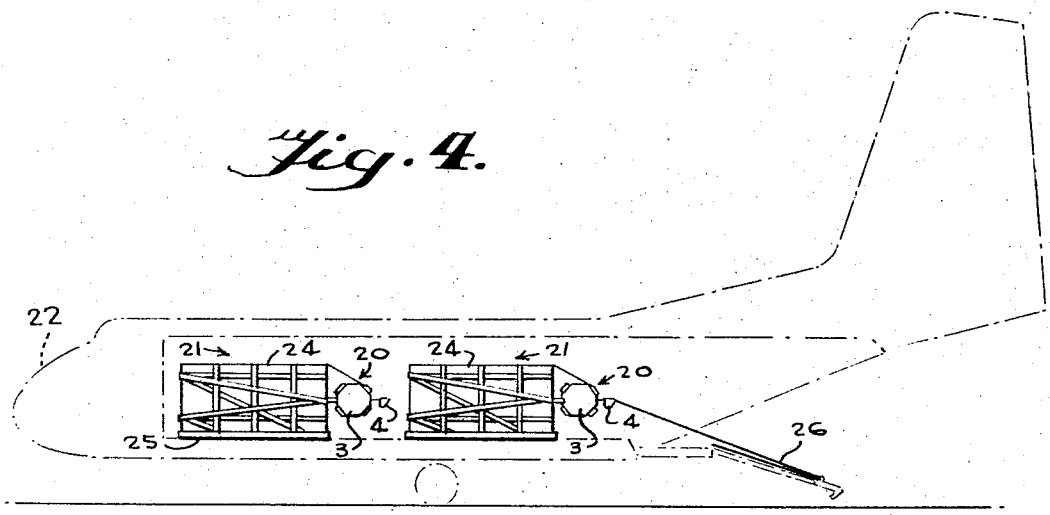
FIGURE 4 is a somewhat diagrammatic illustration of a cargo extraction system embodying the present invention.

The operation will be first explained by way of example with reference to the arrestment barrier system for vehicles illustrated in FIGURE 1. The relationship of like parts and their corresponding operation in a cargo extraction system will also be described, similar parts being designated by like reference characters in the descriptions of both systems.

Referring now to the drawings, FIGURES 1 and 2 represent such an arrestment system. Barrier 1. may be of any suitable material such as a standard nylon net or chain link fence. Existing fence posts 2 may be used to anchor the system, but if none are available at the desired location, suitable anchoring means may be driven into the ground or any large stationary object may be utilized, for example, a tree or trees.

Secured to and situated between each end of barrier net 1 and anchor posts 2 are two or more energy absorbing devices. The energy absorbing arrangement illustrated in FIGURE 2 consists of a larger energy absorber 3 and a smaller load limiter 4, each containing a coiled length of metal tape 5. Tape 5 is expendable.

Energy absorber 3, as shown, conforms to the description contained in my earlier U.S. Patent No. 3,211,260.

The energy absorber 3 may be described generally as comprising a container housing 6 formed of two similarly configurated parallel side plates 7a, 7b and, in the herein described embodiment, two inwardly concave wall members 8a, 8b serving as spacers between the side plates 7a, 7b extending substantially along the peripheries of the side plates defining a cylindrical cavity or chamber 9 for the coil 5a of metal tape 5. The wall member 8a may be hinged to the plates 7a, 7b at one end thereof by a pivot pin 10a and be releasably secured to the side plates at its other end by a removable pin 10b to permit the wall member 8a to be swung outwardly about pivot pin 10a for ease of reloading of the energy absorber 3 with metal tape. An exit passage 9' from the cavity 9 between confronting ends of the wall members 8a, 8b is provided with offset pins 11 or similar cylindrical surface members disposed in an array to define a serpentine path along which the tape 5 is drawn from the cavity 9 to deform the tape in a series of bends beyond its elastic limit.

When barrier 1 is struck by a heavy load, such as a truck, or by a normal sized vehicle travelling at a high rate of speed, the initial impact imparts a high energy jerk or snap through the barrier 1 and cable 12 which causes the extraction of metal tape 5 from the energy absorber 3, spinning up the coil of tape 5. Tendency toward sudden "spin-up" will lead to high inertia forces which must be alleviated or the element will break.

The solution is a second and smaller unit which has been described as a load limiter 4. Since the underlying theory of energy absorption remains the same, load limiter 4 is constructed similarly to energy absorber 3, except that it is smaller since less length of tape is required. As depicted for illustrative purposes, the housing 13 is of a modified trapezoidal configuration but may take any convenient form.

Load limiter 4 comprises two side plates 14 secured together by a number of bolts 15 situated in a circular arrangement about the periphery thereof and defining a cavity for reception of a coil of metal tape, for example a coil 5b of tape 5 formed at the end thereof opposite the coil 5a. A series of offset pins 16 or similar cylindrical surface members extend between the upper portions of the side plates 14, defining a serpentine path along which the element 5 travels when drawn in a direction away from the load limiter 4. Pins 16 are used in the load limiter 4 to facilitate insertion and removal of the metal element 5, but a secondary reason is that different diameter pins may be used to vary the load imposed.

In practice, a length of metal element 5 is predetermined to be accommodated in energy absorber 3. When load limiter 4 is used in the manner depicted in FIGURE 2, the outer section of tape 5 is placed around the pins 16 and inserted into the load limiter 4. The pin-receiving openings of the load limiter may be more closely spaced or the pins may be of smaller diameter than the comparable metal element bending means 11 of the energy absorber 3. This increases the load required to pull the metal element through the load limiter 4. However, since the length of metal element 5 stored in this unit 4 is only a few feet, compared to the hundreds of feet in the large energy absorber 3, the inertia of the small unit 4 is almost negligible.

In operation, the initial shock or snap caused by the impact of a vehicle striking the barrier is taken up by load limiter 4. The load imposed by the load limiter 4 on the tape 5 is designed so that it is in excess of the load required to pull metal element 5 from the energy absorber 3, but below the breaking strength of the metal element itself. This will be explained in more detail later.

As tape 5, coiled in energy absorber 3, picks up speed, the inertia is overcome and the "spin-up" load decreases. When the combined metal bendnig and inertia load transmitted to metal element 5 from energy absorber 3 falls below the load imposed upon element 5 by load limiter 4, the load limiter 4 stops paying out the metal element and acts merely as a connector to transmit load from the metal element to the anchoring means. In actual practice, the load limiter 4 only pays out a few feet of the metal element 5 before coming to rest.

There is a variable relationship between the load limiter 4 and the energy absorber 3 that can be calculated and controlled. If this is understood, an energy absorbing system can be designed to take specific impacts and loads. It is common knowledge that, knowing velocity of a vehicle, the energy generated can be calculated.

The load imposed by the bending means 11 and 16 of the energy absorber 3 and load limited 4 can be calculated for different metal elements of different dimensions. It is important that the difference between the pull or load exerted by each unit multiplied by the number of feet in the smaller unit 4 be greater than the energy required to "spin-up" the larger mass in the large unit 3.

Referring back to FIGURE 2, the embodiment is shown wherein a continuous metal element 5 is used, i.e., the same element extending into both units 3 and 4. In the energy absorber 3, the element is longer and the inertia is therefore higher than that of the load limiter 4 containing only a short segment of metal element 5. To compensate for the high inertia of the energy absorber 3 and the resulting high "spin-up" load, smaller diameter pins 16 are used in the load limiter 4 than in the energy absorber 3, the pins 16 are spaced closer together laterally, or the number of pins 16 over which the metal element is threaded is increased.

A difference in energy absorption may also be accomplished by using one size of metal element, such as metal tape 5, in the energy absorber 3 and a different sized metal element 17 in the load limiter 4, as shown in FIGURE 3. This would, of course, necessitate a connection of some sort, such as a splice or connecting fixture 11 between the two units. In such case, all other factors being equal, one could effect the difference in load imposed by each unit by using elements of different width, thickness, or hardness in the two units, or by metal bending pins of different diameter in the two respective units.

The arrangement of FIGURE 3, is structurally more complex than the arrangement of FIGURE 2, but may lend itself to a greater degree of manipulation of loads than does the latter arrangement.

Figure 5:
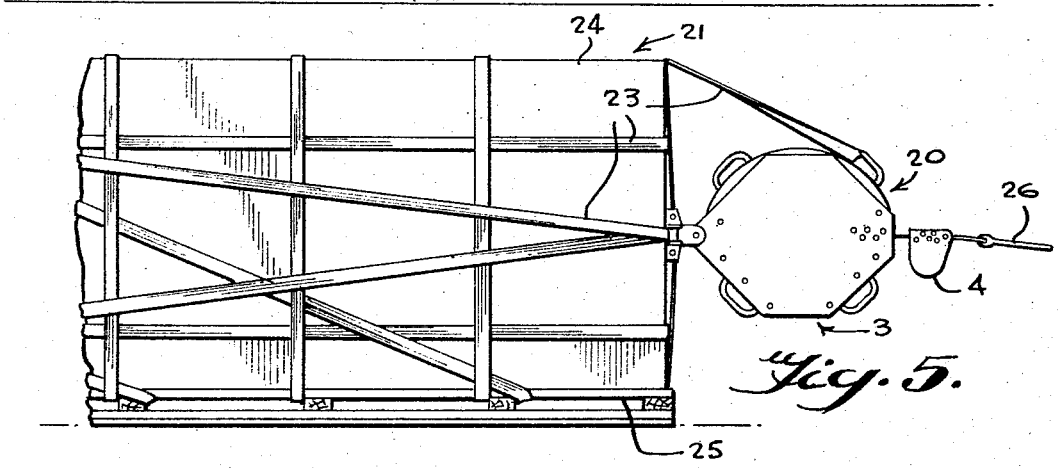
FIGURE 5 is an enlarged side elevation view of the energy absorber system showing the same coupled with a portion of a cargo load in the cargo extraction system.
Figure 6:
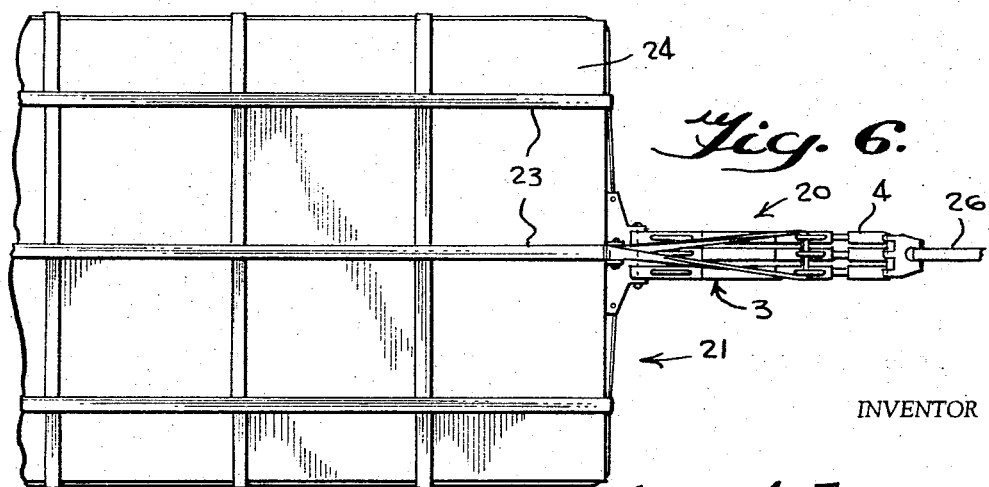
FIGURE 6 is a top plan view of the energy absorber system.

A cargo extracting system application for the present invention in illustrated in FIGURES 4, 5, 6 and 7, wherein the energy absorber system generally indicated at 20, is to be installed on each of one or more cargo pallet assemblies 21, disposed in the cargo compartment of a cargo aircraft indicated in phantom lines at 22. In such a system, one or a plurality of sets of standard energy absorbers 3 and load limiters 4, each for example of the construction hereinbefore described, are coupled to the cargo binding harness 23 securing an associated cargo load 24 to its pallet 25 between the cargo load and the conventional extraction lanyard 26 to be trailed from the aircraft 22 in any suitable manner. The lanyard 26 terminates in a hook member (releasably mounted on the rear, free end of a long pole or tube for manipulating the hook, if desired) for engaging a cable or cross-field pendant of a ground installation to draw the cargo pallet assembly 21 from the aircraft as the latter makes a pass over the ground installation.

The proper number of sets of energy absorbers 3 and load limiters 4 are installed on the cargo pallet assembly 21 to match the load, for example three parallel sets each formed of a series connected energy absorber 3 and load limiter 4 may be installed by connecting the housings 16 of the three energy absorbers 3 to the cargo binding harness 23 and connecting the side plates 14 of the three load limiters 4 to the extraction lanyard 26 as shown, for an assumed bulk cargo weighing 6,000 pounds, and energy absorbers 3 rated as capable of extracting 2000 lbs. at about 100 knots. A single metal element 5 may be formed with coils at its opposite ends disposed in the cavities defined by each series connected set of an energy absorber 3 and load limiter 4, or different sized intercoupled metal elements 5 and 17 may be coiled in the respective energy absorber 3 and load limiter 4, as desired, and differences in energy absorption may be provided for in the same manner as described in connection with the previous application.

As one example of a suitable ground installation for the cargo extraction system indicated in FIGURE 7, a crossfield pendant and ground anchor assembly 30 may be installed at a suitable ground site, wherein the crossfield pendant is a three part system consisting of two lengths of nylon webbing or rope 31, 32 and one length of steel cable 33. The pendant system may be laid out on the field in such a way that the nylon segments run nearly parallel to the aircraft approach path and the steel cable 33 is connected at its ends to the nylon segments 31, 32 at intermediate points along the latter, to extend crosswise of the flight path. The upfield ends of the nylon segments 31, 32 may be anchored down by suitable high test ground anchors and their downfield ends may be merely staked down by simple stakes. The nylon segments, being somewhat elastic are drawn inwardly as indicated by phantom lines in FIGURE 7 and somewhat stretched, when the trailing cargo extracting hook engages the cable 33, to serve as an elastic shock absorber during initial impact. Although the initial peak inertia load on the metal element of a simple metal bender energy absorber, not associated with a load limiter as herein described, might still be sufficient for heavy cargo loads and aircraft speeds of the character normally encountered during cargo extraction to break the metal element, the load limiter 4 or plurality of such load limiters, take up the initial peak inertia load to maintain the same below values which might break the metal element, after which the energy absorber unit or units 3 operate in the usual manner to absorb kinetic energy and bring the cargo to a stop.

Installation of the energy absorber systems on the cargo pallet assemblies has significant advantages, in that the energy absorber systems can be properly matched to each cargo pallet assembly when the cargo is loaded and be carried therewith as a composite assembly, minimal ground preparation is called for, and there is no need to replace expended ground-based metal bender energy absorbers between successive extractions of cargo pallet units, or to recycle or rewind ground based energy absorbers, and there is freedom from dependence on accuracy of communication systems to achieve proper adjustment of ground based energy absorbers or proper pilot selection from among plural ground cable systems to match different cargo loads.

It is to be understood that the embodiments shown are illustrative of the principal operation of an energy absorbing and peak inertia load dissipating system and that certain changes, alterations, modifications or substitutions can be made in the structure of the devices without departing from the spirit and scope of the claims.

What is claimed is:

1. An energy absorbing and inertia load dissipating system for absorbing the kinetic energy of dynamic loads and concurrently dissipating peak initial acceleration loads comprising elongated bendable metal strip means having a first end portion formed into a first coil and a second end portion formed into a second shorter coil, a metal bender energy absorber subassembly including first container means for storing said first coil having an exit passage through which said strip means may be extracted and deforming means along said passage to engage the strip means as it passes from said first container responsive to extracting forces thereon to progressively and successively bend increments thereof beyond their elastic limit, and a load limiter subassembly for dissipating energy of peak initial acceleration loads on said strip means including a second container for storing said second coil having means therein to resist extraction of said strip means therefrom with a predetermined restraining force in excess of that force required to extract said strip means from said first container.

2. An energy absorbing and inertia load dissipating system as defined in claim 1, wherein said second container includes a series of alternately staggered cylindrical surface members arranged to define a serpentine path along which increments of the strip means are progressively and successively bent during extraction thereof from said second container to diminish the energy of peak acceleration loads on the strip means below levels which may break the strip means.

3. An energy absorbing and inertia load dissipating system as defined in claim 2, wherein said deforming means of said first container includes a series of alternately staggered cylindrical surface members defining a serpentine path of said first container, along which the metal strip means is extracted.

4. An energy absorbing and inertia load dissipating system as defined in claim 3, wherein the respective diameter, spacing and number of cylindrical surface members of said second container are selected relative to the diameter, spacing and number of the cylindrical surface members of said first container to provide the greater predetermined restraining force for resisting extraction of said strip means from said second container.

5. An energy absorbing and inertia load dissipating system as defined in claim 2, wherein the respective diameter, spacing and number of cylindrical surface members of said second container are selected relative to the metal bending properties of the deforming means of said first container to provide the greater predetermined restraining force for resisting extraction of said strip means from said second container.

6. An energy absorbing and inertia load dissipating system as defined in claim 1, wherein said metal strip means comprises first and second series connected metal strip members coupled together at adjacent ends thereof intermediate said energy absorber subassembly and said load limiter subassembly, said first strip member having said first coil formed therein and extending externally of said first container, said second strip member having said second coil formed therein and extending externally of said second container, and said second strip member having different physical characteristics from said first strip member to yieldably resist extraction of the second strip member from said second container with a predetermined restraining force in excess of the force required to extract said first strip member from said first container.

7. An energy absorbing and inertia load dissipating system as defined in claim 2, wherein said metal strip means comprises first and second series connected metal strip members coupled together at adjacent ends thereof intermediate said energy absorber subassembly and said load limiter subassembly, said first strip member having said first coil formed therein and extending externally of said first container, said second strip member having said second coil formed therein and extending externally of said second container, and said second strip member having different physical characteristics from said first strip member to yieldably resist extraction of the second strip member from said second container with a predetermined restraining force in excess of the force required to extract said first strip member from said first container.

8. An energy absorbing and inertia load dissipating system as defined in claim 3, wherein said metal strip means comprises first and second series connected metal strip members coupled together at adjacent ends thereof intermediate said energy absorber subassembly and said load limiter subassembly, said first strip member having said first coil formed therein and extending externally of said first container, said second strip member having said second coil formed therein and extending externally of said second container, and said second strip member having different physical characteristics from said first strip member to yieldably resist extraction of the second strip member from said second container with a predetermined restraining force in excess of the force required to extract said first strip member from said first container.

9. An energy absorbing and inertia load dissipating system as defined in claim 1, in combination with an airborne cargo load, cargo harness means binding said energy absorber subassembly to the cargo load, an extraction lanyard having a terminal hook member adapted to be trailed from an aircraft carrying the cargo load to engage a ground cable installation and exert extracting forces on the cargo load to withdraw the same from the aircraft, and means coupling the extraction lanyard to the load limiter subassembly, whereby the energy absorber system interposed between the cargo load and extraction lanyard dissipates peak initial acceleration forces and absorbs the momentum forces upon engagement of the hook member with the ground installation.

10. The combination recited in claim 9, wherein a plurality of sets each comprising a series connected energy absorber subassembly and load limiter subassembly are connected in parallel between the cargo load and extraction lanyard to dissipate and absorb preselected loads substantially matched to the load rating of the cargo load.

References Cited
UNITED STATES PATENTS 3,179,358    4/1965    Schlegel _____ 244—110
3,211,260   10/1965    Jackson _____ 188—1

FERGUS S. MIDDLETON, *Primary Examiner.*

T. BUCKMAN, *Assistant Examiner.*